R. SPRINGBORN.
UNIVERSAL PIPE JOINT.
APPLICATION FILED FEB. 16, 1920.

1,402,545.

Patented Jan. 3, 1922.

Inventor
Richard Springborn
By Brockett & Hyde
Attys.

UNITED STATES PATENT OFFICE.

RICHARD SPRINGBORN, OF CLEVELAND, OHIO.

UNIVERSAL PIPE JOINT.

1,402,545.  Specification of Letters Patent.  Patented Jan. 3, 1922.

Application filed February 16, 1920. Serial No. 359,146.

*To all whom it may concern:*

Be it known that I, RICHARD SPRINGBORN, a citizen of the United States, residing at Cleveland, in the county of Cuyahoga and State of Ohio, have invented certain new and useful Improvements in Universal Pipe Joints, of which the following is a specification.

This invention relates to universal pipe joints such as are used in conduits for steam, compressed air or other fluid pressure lines.

The object of the invention is to provide an improved universal pipe joint of simple construction in which the sealing surfaces are held together by yielding means, in which leakage to the outside of the joint is practically wholly prevented, and in which improved means are provided to lubricate the moving surfaces.

Further objects of the invention are in part obvious and in part will appear more in detail hereinafter.

Figure 1:
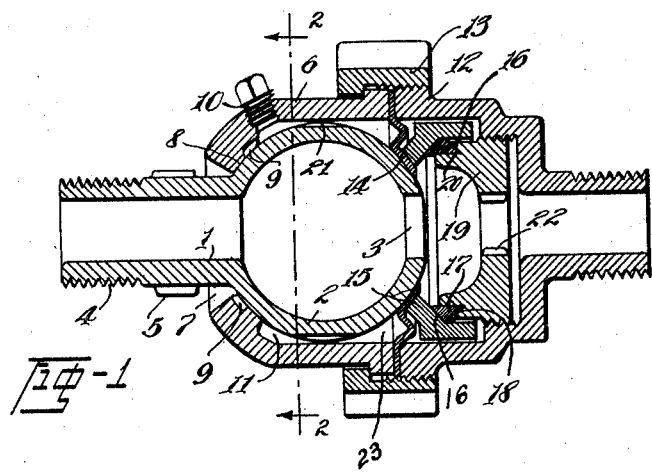
Figure 2:
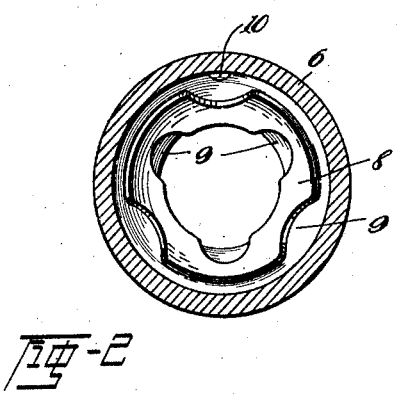
Figure 3:
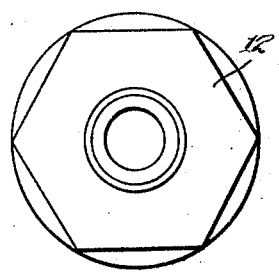
Figure 4:
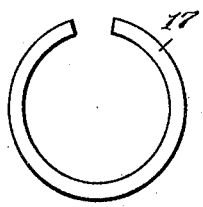

In the drawings, which represent one suitable embodiment of the invention, Fig. 1 is a central longitudinal sectional elevation; Fig. 2 is a section through the socket member on the line 2—2, Fig. 1; Fig. 3 is an end view from the right in Fig. 1; and Fig. 4 is a detailed view of a spring ring.

The universal pipe joint shown in the drawings comprises two members, to-wit, a ball member and a socket member to receive the same, said members being arranged to permit the passage of fluid therethrough and to also have universal or swivelling motion relative to each other.

The ball member 1 has a hollow spherical portion 2 open at one end, as at 3, and provided at its opposite end with the threaded connection 4 to the conduit system. This member may be provided with any suitable means for turning it, such as the projections 5.

The co-operating socket member is made up of a number of parts, to-wit, a hollow member 6 which surrounds the ball 2 and has an opening 7 in one end larger in diameter than the threaded member 4 so as to permit the ball to be turned to an inclined position relative to the member 6. Member 6 has a sealing surface 8 which is curved to the same spherical surface as the ball and slides thereon. This surface is interrupted by inner and outer sockets or recesses 9 adapted to hold lubricant, such as graphite or grease, the recesses being staggered relative to each other so that turning motion of the ball and socket members will thoroughly lubricate all of the surfaces. 10 represents a plug closing an opening to a cavity 11 which can be filled with lubricant through said opening.

Member 6 is held in rigid relation with a base or body member 12 by a union 13, and the clamping effect of said union also holds solidly in place a diaphragm or washer 14 formed of some soft metal, such as copper or the like, which is stamped to proper shape so that its inner portion fits the outer surface of the ball member. This diaphragm or washer is slightly flexible and is held yieldingly to its seat against the ball by an annular pressure member 15, which slides longitudinally in the cavity within member 12 and is provided with a conical seat or surface 16 to co-operate with a conical surface on a yielding compression member or spring 17. This spring is preferably of the form shown in my prior patent for cushioning device, No. 1,278,246, dated September 10, 1918, and is essentially a cast metal annulus having two outwardly beveled surfaces, one to co-operate with the surface 16 and the other to co-operate with the beveled surface 18 of an adjustable nut 19 having a portion 20 lying within and supporting the annulus 17. Member 19 is threaded into a portion of the base or body 12 and is provided with suitable means for turning it, such as the projections 22. 21 indicates a series of shallow slots in the ball surface permitting lubricant to flow from chamber 11 past the ball to the chamber 23 adjacent the diaphragm 14 from which it works its way to the sliding surfaces between said diaphragm and the ball.

By screwing up the member 19 the ball is held firmly in the socket and no fluid pressure can escape except past the surfaces at the diaphragm 14, which surfaces are held yieldingly together by the pressure of the spring 17.

What I claim is:

1. A universal pipe joint, comprising co-operating ball and socket members, a sealing member in said socket member, having a tapered seat, a nut, and a compressible split annulus held by said nut against said seat.

2. A universal pipe joint, comprising co-operating ball and socket members, having sliding seating surfaces, the surface of said socket member having a series of staggered recesses for holding lubricant.

3. A universal pipe joint, comprising cooperating ball and socket members having sliding seating surfaces, the surface of said socket member having a series of staggered recesses for holding lubricant, and yielding means for holding said surfaces in engagement.

4. A universal pipe joint, comprising cooperating ball and socket members, said socket member having a diaphragm fitting a portion of the ball surface, a seat member lying adjacent said diaphragm, and a compressible split annulus yieldingly pressing said seat member against said diaphragm.

In testimony whereof I affix my signature.

RICHARD SPRINGBORN.